(12) United States Patent
Tain

(10) Patent No.: US 6,581,189 B1
(45) Date of Patent: Jun. 17, 2003

(54) COMPUTER IMPLEMENTED METHOD AND PROGRAM FOR AUTOMATING FLIP-CHIP BUMP LAYOUT IN INTEGRATED CIRCUIT PACKAGE DESIGN

(75) Inventor: Alexander C. Tain, Milipitas, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 699 days.

(21) Appl. No.: 09/007,138

(22) Filed: Jan. 14, 1998

(51) Int. Cl.[7] .............................................. G06F 17/50
(52) U.S. Cl. ................................................ 716/3; 703/1
(58) Field of Search ........................ 395/500.04; 716/3; 703/1

(56) References Cited

U.S. PATENT DOCUMENTS

| | | | | |
|---|---|---|---|---|
| 4,942,536 A | * | 7/1990 | Watanabe et al. ............ | 364/490 |
| 5,517,421 A | * | 5/1996 | Jimbo et al. ................. | 364/491 |
| 5,608,638 A | * | 3/1997 | Tain et al. .............. | 364/468.28 |
| 5,686,764 A | * | 11/1997 | Fulcher ....................... | 527/778 |
| 5,720,018 A | * | 2/1998 | Muller et al. ................ | 395/133 |
| 5,736,456 A | * | 4/1998 | Akram ........................ | 438/614 |
| 5,754,826 A | * | 5/1998 | Gamal et al. ................ | 395/500 |
| 5,764,241 A | * | 6/1998 | Elliott et al. ................. | 345/473 |
| 5,777,383 A | * | 7/1998 | Stager et al. ................ | 257/700 |
| 5,819,062 A | * | 10/1998 | Srikantappa ................. | 395/500 |
| 5,848,263 A | * | 12/1998 | Oshikiri ....................... | 395/500 |
| 5,850,348 A | * | 12/1998 | Berman ....................... | 364/488 |
| 5,933,356 A | * | 8/1999 | Rostoker et al. ............ | 364/489 |
| 5,936,868 A | * | 8/1999 | Hall ............................ | 364/491 |
| 5,946,477 A | * | 8/1999 | Ito ........................... | 395/500.1 |
| 5,949,693 A | * | 9/1999 | Tandler ....................... | 364/512 |

* cited by examiner

*Primary Examiner*—Matthew Smith
*Assistant Examiner*—A. M. Thompson

(57) ABSTRACT

A digital computer automatically converts an input representation of a pattern of flip-chip integrated circuit interconnect bumps in a format suitable for a circuit design program into an output representation in a format suitable for a package design program. A converter program is adapted by script files to convert the input representation into an intermediate representation in a format suitable for a mechanical design program in which only a layer which includes the bumps is extracted from the input representation which can include a substantial number of layers. A mechanical design program is adapted by scripts to automatically input the intermediate representation, identify and label the interconnects, and create the output representation in which the interconnects are labeled. The mechanical design program can be further adapted by scripts to rotate, mirror and/or shrink the pattern. A package design program inputs the output representation and draws the labeled interconnects. A comparator program compares the output representation with a previously created output representation to identify differences therebetween.

31 Claims, 6 Drawing Sheets

COMPUTER IMPLEMENTED METHOD AND PROGRAM FOR AUTOMATING FLIP-CHIP BUMP LAYOUT IN INTEGRATED CIRCUIT PACKAGE DESIGN

BACKGROUND OF THE INVENTION

1. Field of the Invention

The present invention generally relates to the art of microelectronic integrated circuit fabrication, and more specifically to a computer implemented method and software for automating flip-chip bump layout in integrated circuit package design.

2. Description of the Related Art

Microelectronic integrated circuits are packaged in a number of configurations. A type of integrated circuit 10 which is currently in widespread use is known as a "flip-chip" and is illustrated in FIGS. 1 to 3. The integrated circuit 10 includes a package 12 which includes a body 14, a plurality of pins 16 for connecting the circuit 10 to a socket of an electronic device such as a computer (not shown), and a plurality of bumps 18 on a surface of the package 12 opposite a surface from which the pins 16 extend. Although not visible in the drawing, the bumps 18 are connected to the pins 16 through interconnects inside the body 14 of the package 12. The interconnects can be formed in a number of layers that are separated by insulating layers and interconnected by vertical interconnects (vias).

The integrated circuit 10 further includes a microelectronic circuit die 20 which comprises a semiconductor substrate (silicon, gallium arsenide, etc.) that is processed to include a large number of microelectronic circuit devices. The die 20 can include devices which are interconnected to perform the functionality of a microprocessor, memory, input-output device, etc. A plurality of bumps 22 are formed on a surface of the die 20 and are electronically connected to the microelectronic devices through internal interconnect layers and vias (not shown). The bumps 22 on the die 20 are conjugate to the bumps 18 on the package 12.

The package 12 and the die 20 are fabricated separately and then assembled together such that the bumps 18 and 22 electrically contact each other and thereby interconnect the devices of the die 20 with the pins 16 of the package 12. This is typically accomplished by applying solder to either or both of the bumps 18 and 22, mating the die 20 and package 12 such that the bumps 18 and 22 contact each other, and applying heat to reflow the solder.

The configuration is called a "flip-chip" because the die 20 is flipped upside down for assembly to the package 12 such that the bumps 22 face downwardly (toward the package 12). When the die 20 is oriented with the bumps 22 facing up (the same as the bumps 18 of the package 12), the bumps 22 have a mirror image relationship relative to the bumps 18. For example, bumps 18a and 18b of the package 12 are conjugate to bumps 22a and 22b of the die 20 as viewed in FIG. 3.

It is typical for an integrated circuit manufacturer to fabricate dies, obtain packages from an independent supplier, and assemble the dies to the packages to provide complete integrated circuits for sale. Once an integrated circuit die is designed and the pattern of the bumps determined, the manufacturer provides the package supplier with the design so that a suitable package can be designed and manufactured.

Integrated circuit dies are typically designed using computer software which uses a format which is suitable for electronic circuit design. A number of commercial and proprietary circuit design software programs are in current use that produce data files in a format known as Calma GDSII, which is now an industry standard. However, integrated circuit packages are designed using different software programs which produce data files in a format which is incompatible with GDSII.

Current flip-chip integrated circuits have a large number, typically over 1,000, bumps such as illustrated at 22 in the drawings. The pattern of these bumps is known as a Control Collapse Chip Connection (C4) cage. The bumps are laid out in a generally orthogonal pattern including a certain maximum number of possible bump positions, but not all bump positions are used. When a package for a new die is to be designed, the package supplier is provided with the C4 cage and a netlist which indicates which bumps are to be connected to which pins in the package. The internal interconnections in the body 14 of the package 12 are designed in accordance with this data.

The C4 cage is generated by the circuit designer in GDSII format which is not usable by the package designer's software. Conventionally, C4 cage data conversion has been performed manually by printing out the C4 cage pattern, visually examining the individual bumps, and manually entering representative data into the package design software program. This procedure is slow, tedious and highly prone to human error. Any kind of error in an integrated circuit design process is highly undesirable in that it necessitates time consuming and expensive changes in a number of fabrication areas.

In addition, the C4 cage pattern is often changed during the development of the die, and it is difficult to identify individual changes and appropriately modify the data for the package design program. Adapting for changes is especially prone to error since changes can be easily overlooked due to the large number of bumps.

SUMMARY OF THE INVENTION

The present invention overcomes the deficiencies of the prior art by providing a computer implemented method and program for automatically converting interconnect bump pattern data for a flip-chip integrated circuit which is produced by circuit design software in GDSII format to data which can be automatically input into package design software. The present method also enables changes in the bump pattern to be automatically identified.

In accordance with the present invention, a digital computer automatically converts an input representation of a pattern of flip-chip integrated circuit interconnect bumps in a format suitable for a circuit design program into an output representation in a format suitable for a package design program. A converter program is adapted by script files to convert the input representation into an intermediate representation in a format suitable for a mechanical design program in which only a layer which includes the bumps is extracted from the input representation which can include a substantial number of layers.

A mechanical design program is adapted by scripts to automatically input the intermediate representation, identify and label the interconnects, and create the output representation in which the interconnects are labeled. The mechanical design program can be further adapted by scripts to rotate, mirror and/or shrink the pattern. A package design program inputs the output representation and draws the labeled interconnects. A comparator program compares the output representation with a previously created output representation to identify differences therebetween.

The present invention greatly reduces the time required for creating data which is to be provided to an integrated circuit package supplier for designing or changing a package for a particular flip-chip integrated circuit die. The invention also eliminates human error from the procedure, thereby greatly improving the reliability of the design process.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 1:
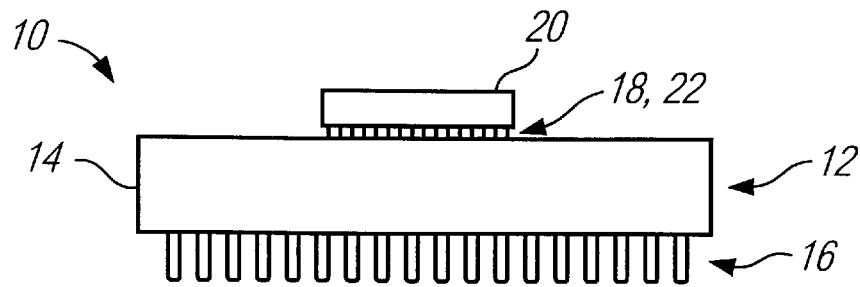
FIG. 1 is a side elevation of a flip-chip integrated circuit chip.
Figure 2:
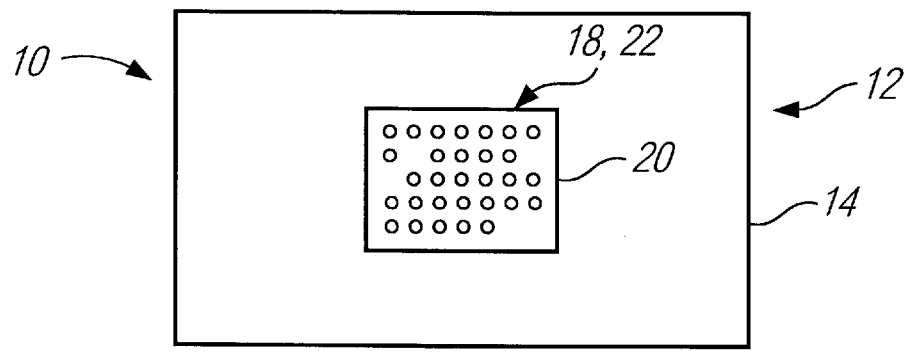
FIG. 2 is a plan view of the chip.

In accordance with the present invention, an input representation of a pattern of integrated circuit interconnects is produced by a circuit designer in a format suitable for a circuit design program. The pattern for the bumps of a flip-chip integrated circuit die such as described above with reference to FIGS. 1 to 3 is known as a C4 cage. The input representation can be produced by any of a number of commercially available circuit design software programs, and will typically be in a format which is suitable for such programs. The current industry standard format for these programs is Calma GDSII.

Figure 4:
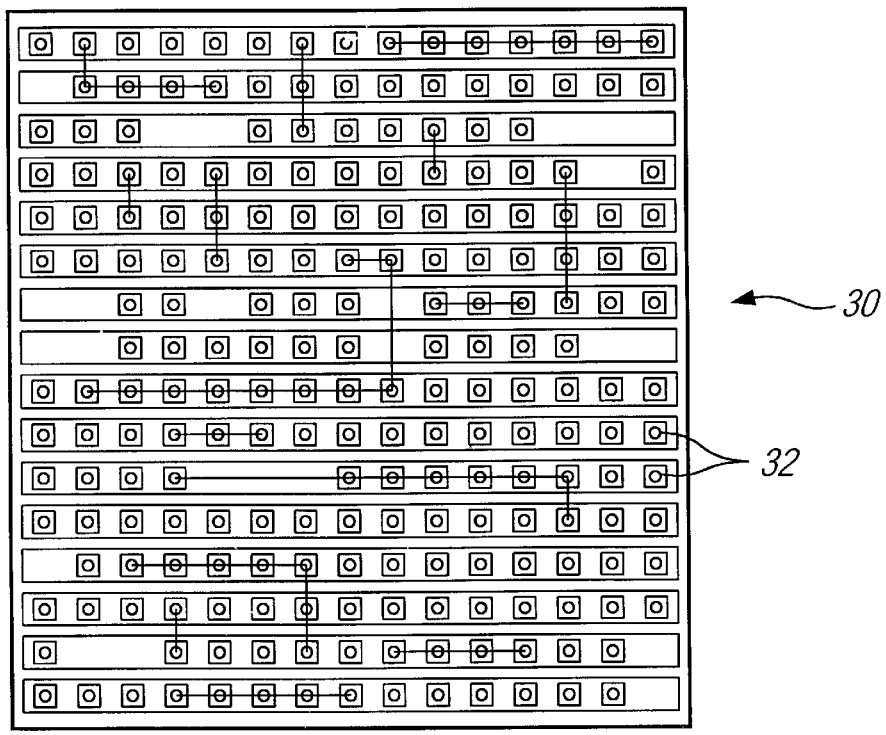
FIG. 4 is a simplified view of an input representation of a pattern of flip-chip bumps of the die.

A simplified input representation 30 is illustrated in FIG. 4. The data of the representation typically includes not only a layer of the flip-chip integrated circuit die which includes the bumps (the bump layer), but also one or more additional layers. As illustrated in the example of FIG. 4, the data includes bumps 32 which are represented as polygons within polygons as well as other data representing interconnects, etc.

Figure 5:
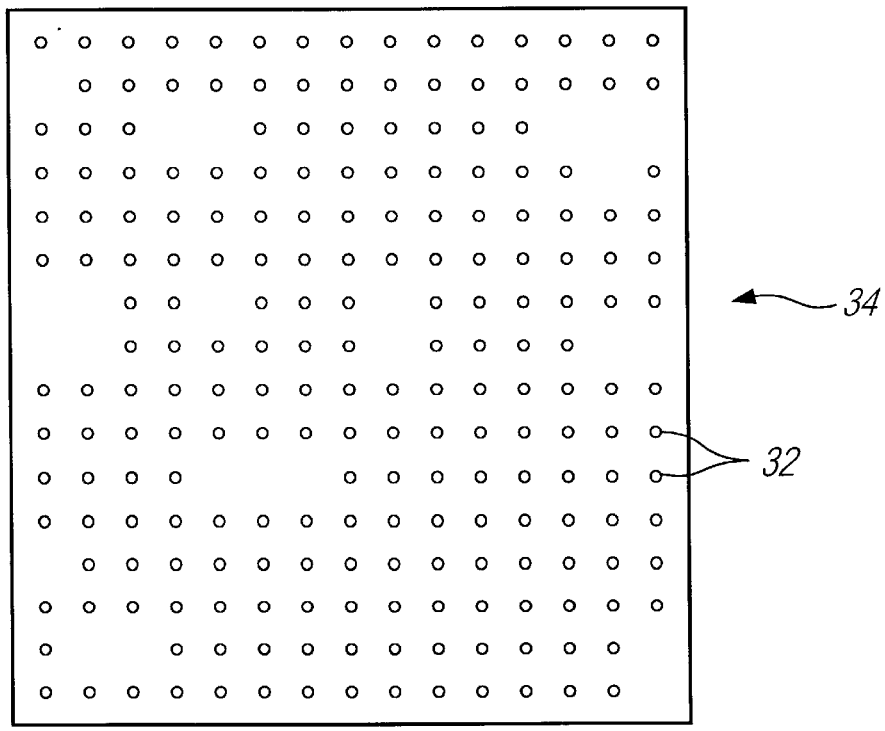
FIG. 5 is similar to FIG. 4 but illustrates the pattern with only a layer which includes the bumps extracted.

In accordance with the present method, the bump layer is extracted from the input representation 30 such that all other data is eliminated. The result of performing this step is illustrated in FIG. 5. The extracted representation is designated as 34 and includes only the bumps 32 which appear as in FIG. 4.

Figure 6:
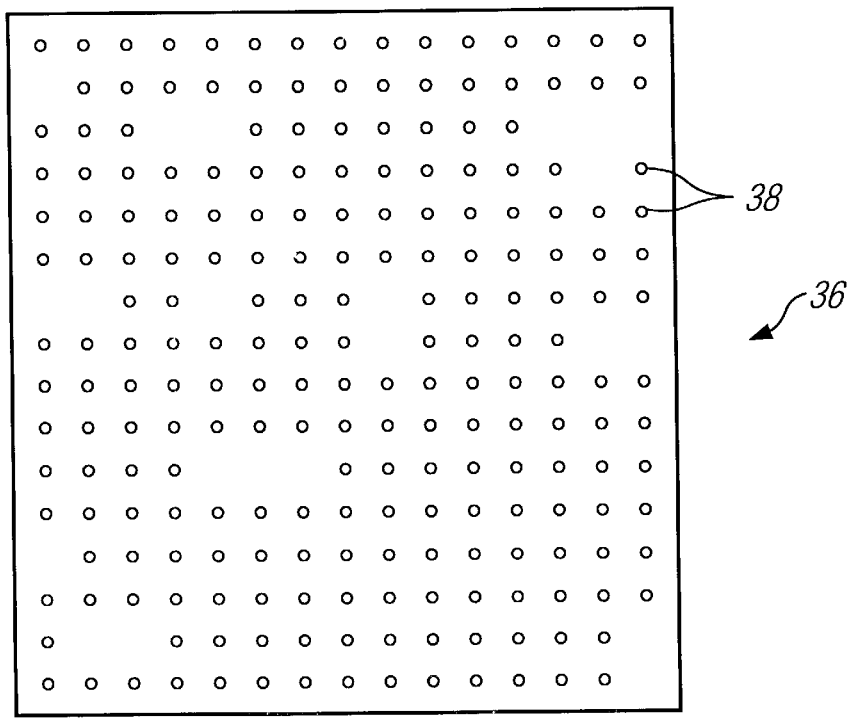
FIG. 6 illustrates an intermediate representation of the pattern.

The next step of the method is to convert the representation 34 into a format which is suitable for a general mechanical design program. The reasons for performing this conversion will be described in detail below. FIG. 6 illustrates an intermediate representation in the new format, preferably the industry standard DXF format. The initial configuration of the bumps has been changed such that the bumps 38 appear as small circles.

Figure 3:
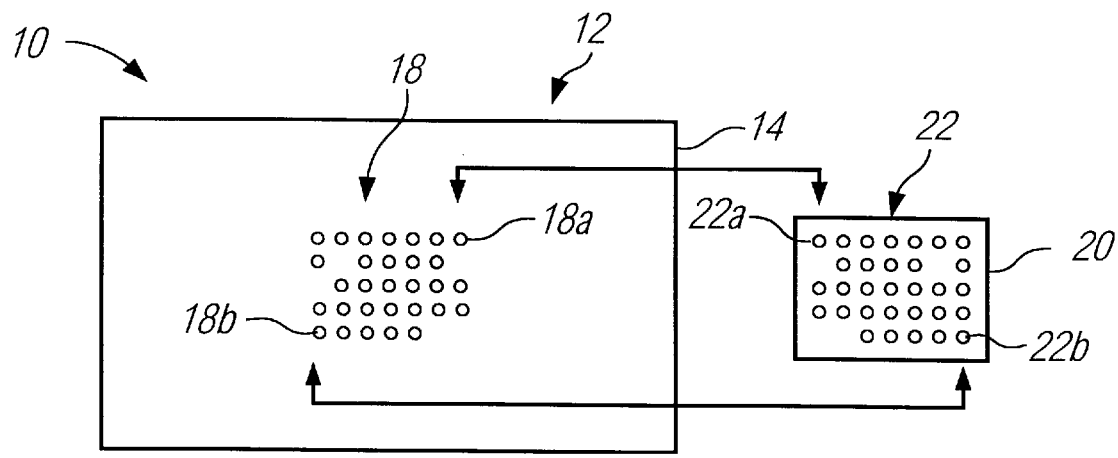
FIG. 3 is plan view of the chip with a flip-chip die removed from a package and inverted.
Figure 7:
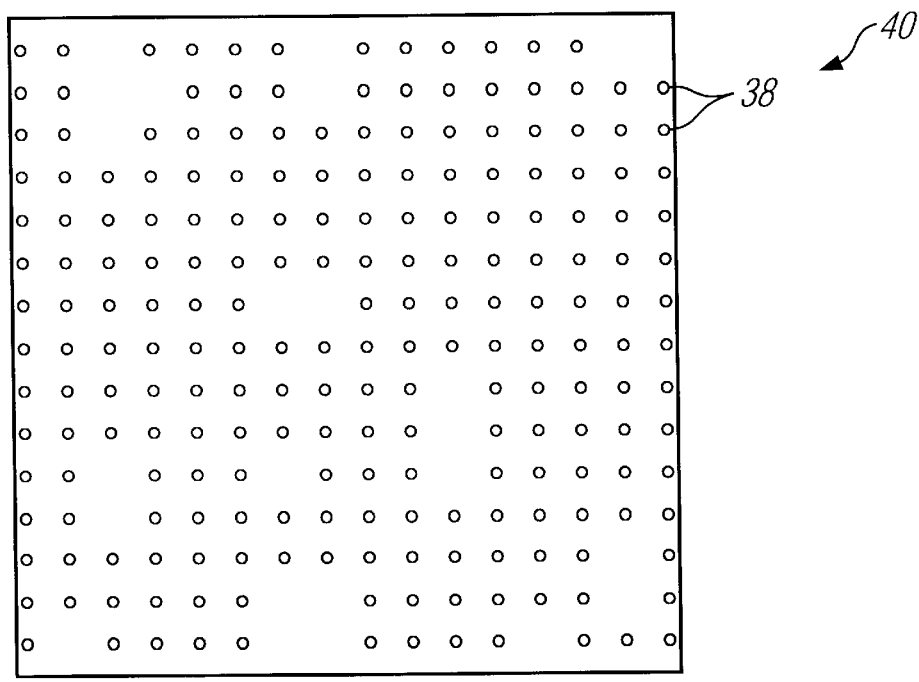
FIG. 7 illustrates the intermediate representation with the pattern rotated by 90°.
Figure 8:
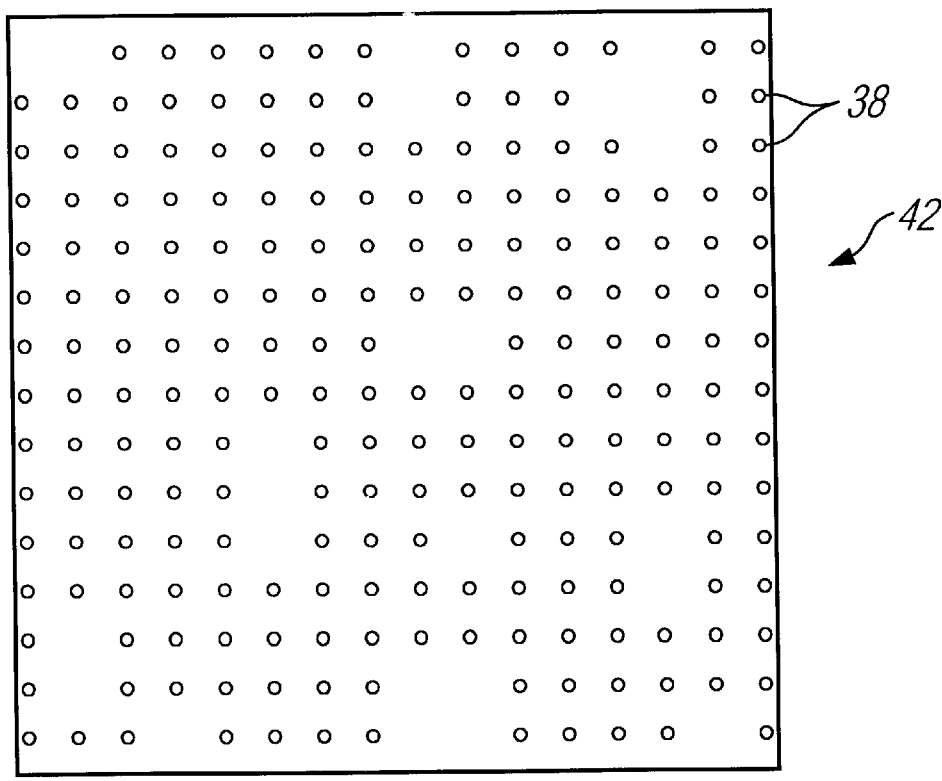
FIG. 8 illustrates the intermediate representation with the pattern mirrored.
Figure 9:
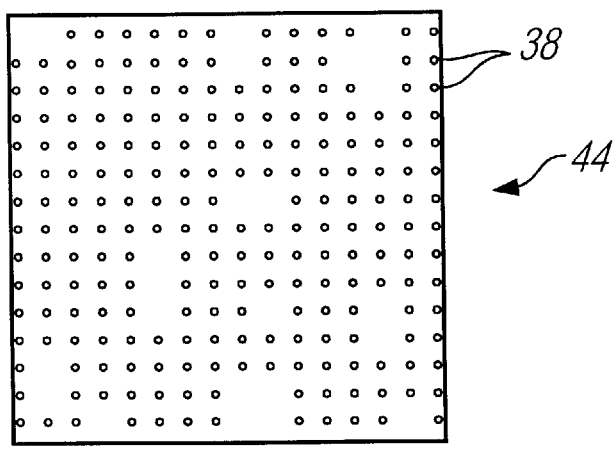
FIG. 9 illustrates the intermediate representation with the pattern shrunk.

Typically, the circuit design program produces the C4 cage pattern in an orientation which is different from that required by the package design program. The pattern 36 is generally produced with the die viewed from the top as illustrated in FIG. 3, and is a mirror image of the bump pattern with the die flipped over for assembly to the package as is required by the package design program. The pattern 36 can also be rotated by 90° or a multiple thereof. FIG. 7 illustrates a representation 40 in which the pattern has been rotated counterclockwise by 90°. FIG. 8 illustrates a representation in which the pattern has been mirrored or flipped over, and FIG. 9 illustrates a representation in which the pattern has been reduced in size or shrunk. These are all in the intermediate representation format for the mechanical design program.

Figure 10:
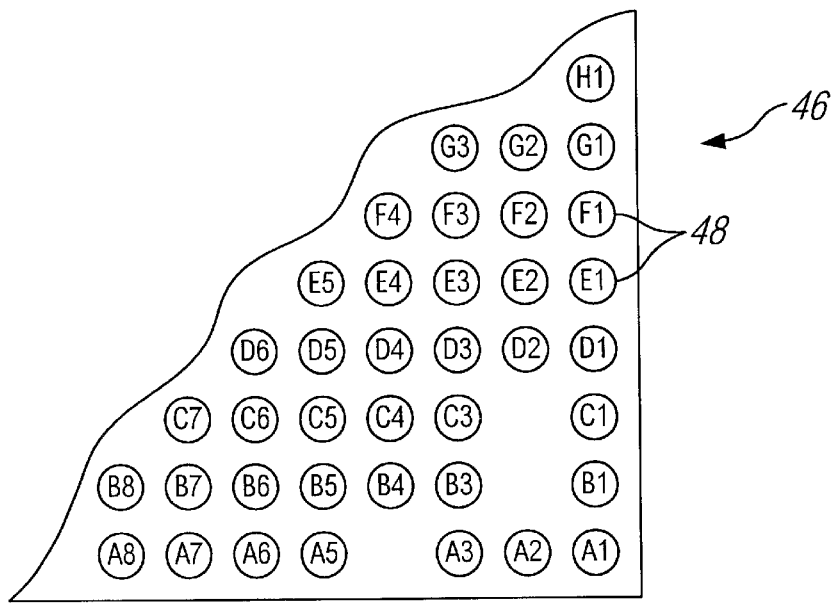
FIG. 10 illustrates an output representation with the bumps labeled.

After any orientation conversions are performed, the bumps are identified by orthogonal or x,y coordinates and labeled. A preferred labeling scheme is illustrated in FIG. 10, in which the bumps are labeled by the letters (A, B, C . . . ) extending vertically upward from the lower right corner, and by numbers extending horizontally leftward from the lower right corner. The finished representation is designated as 46, and the labeled bumps are designated as 48.

Finally, the intermediate representation is used to create an output representation which can be automatically input to a package design program. Typically, the output representation will be data in the native language of the package design program.

Figure 12:
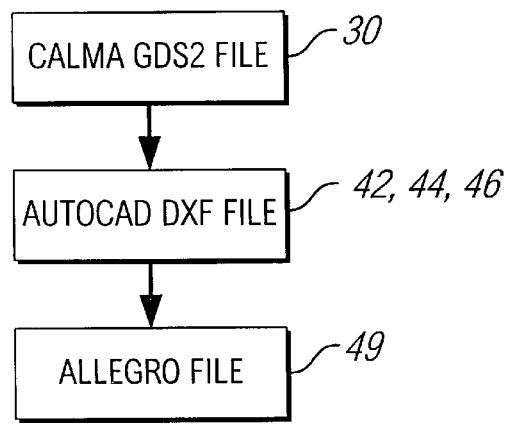
FIG. 12 is a diagram illustrating computer files that are processed in accordance with the invention.

FIG. 12 illustrates digital computer files that are used for practicing the present invention. The input representation 30 is a Calma GDSII file which is produced by a circuit design program such as Virtuoso®, a product of Cadence Design Systems, Inc. of San Jose, Calif. The intermediate representation 42,44,46 is a DXF file which is suitable for a general mechanical design program such as Autocad®, a product of Autodesk®, Inc. of San Rafael, Calif. The output representation, designated as 49, is preferably a data file or files in a format suitable for a package design program such as Allegro™ Advanced Package Designer (APD), a product of Cadence Design Systems.

Figure 11:
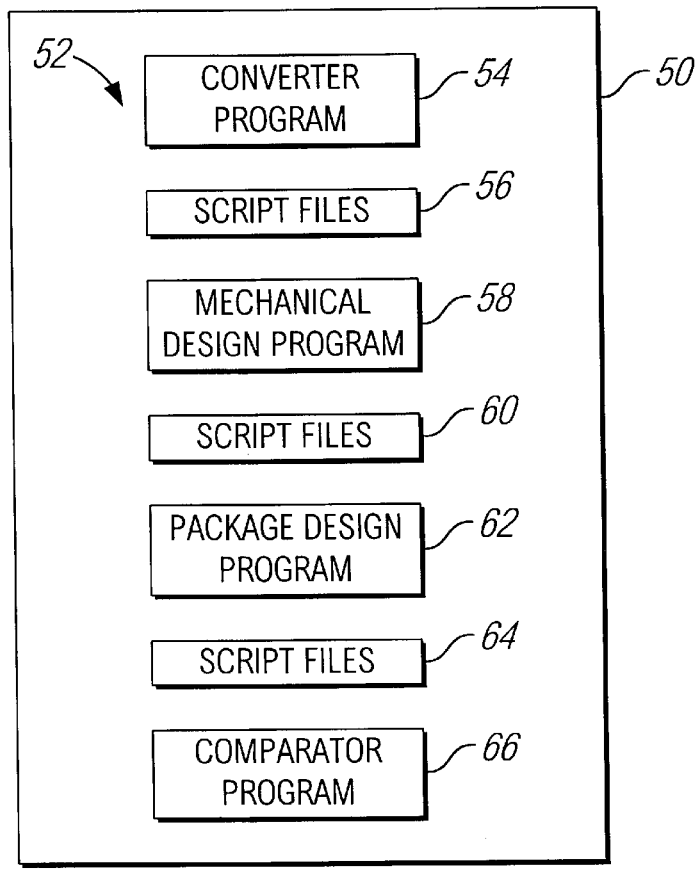
FIG. 11 illustrates a digital storage medium including software programs for practicing the present invention.

FIG. 11 illustrates a digital storage medium 50 for storing software 52 for practicing the present invention. The medium 50 can be in the form of one or more optical disks such as CD-ROMS, one or more magnetic floppy disks, or any combination thereof. The medium 50 can alternatively be in the form of computer volatile or non-volatile memory which is operatively installed in or separate from a digital computer. The software 52 is preferably designed to run on a personal computer or workstation, although the invention can be practiced using a mainframe or any other suitable type of computer.

The software 52 includes an extraction and converter program package 54 such as GDS Filt/ASM 3500 which is available from Artwork Conversion Software of Santa Cruz, Calif., and one or more script files 56 which adapt the program 54 to perform the functionality of the present invention as will be described below. The software 52 also includes a general mechanical design program 58 such as Autocad and one or more associated script files 60, and optionally a package design program 62 such as Allegro which operates on one or more script files 64 to produce the data file or files which is the output of the conversion process. The software 52 can further include a comparator program 66 for identifying differences between two output representations 49.

The programs 54, 58 and 62 are commercially available off-the-shelf, but require the script files 56, 60 and 64 to implement the functionality of the present invention. For this reason, the present invention can be provided to a customer who already has these programs as including only the script files 56, 60 and 64 and optionally the comparator program 66. As an alternative, only the script files 56, 60 and 64 can be provided to a customer who has one or more of the programs 54, 58 and 62 in addition to the missing program 54, 58 and/or 62.

Figure 13:
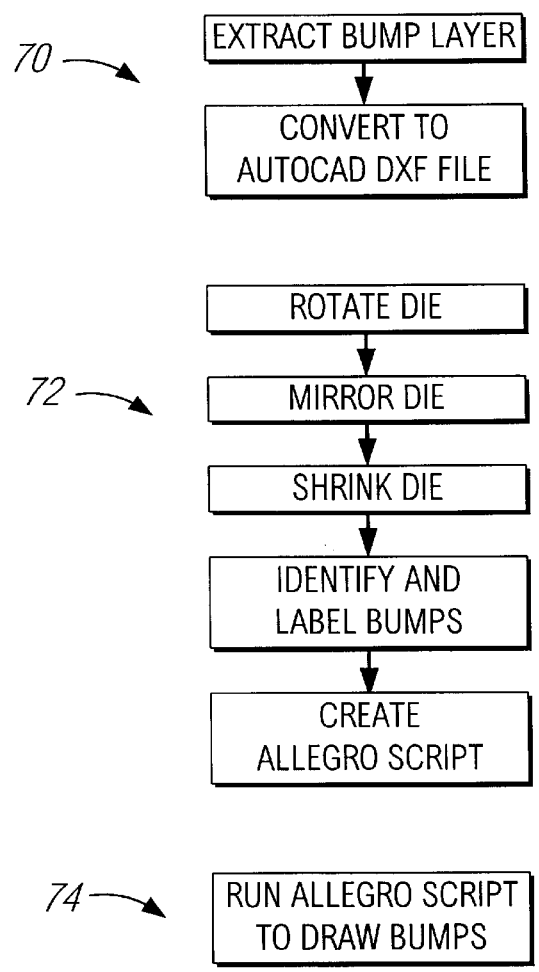
FIG. 13 is a flowchart illustrating steps of a method for practicing the invention.

The present method using the software 52 will now be described in more detail with reference also being made to the flowchart of FIG. 13, with the software 52 being loaded into and run on a digital computer. First, the converter program 54 inputs the GDSII file from the circuit design program. The functionality provided by the script files 56 controls the program 54 to extract the bump layer and convert the GDSII file 30 into DXF format.

More specifically, the script files 56 control the program 54 to prompt the user to input the layer to be extracted (the bump layer). The file 30 is then written to an intermediate file which includes only the bump layer. The intermediate file is then converted to DXF format and inputted as the intermediate representation 42 to the mechanical design program 58 which is launched under control of the script files 60. The method steps performed by the converter program 54 are indicated at 70 in FIG. 13.

The program 58 allows a large variety of computer aided design operations to be performed in an automated manner using script files. The functionality provided by the script files 60 enables the program 58 to perform the steps indicated at 72 in FIG. 13. These steps can include, but are not limited to the following operations:

Rotate the die
    Ask if user wants to rotate the die by 90 degree increments in the counterclockwise direction
    If yes, rotate
    If no, leave as is
Mirror the die
    Ask if user wants to mirror the die
    If yes, mirror
    If no, leave as is
Shrink the die
    Ask if user wants to shrink the die
    If yes, ask how much to shrink
        Shrink the die by the amount user input
    If no, leave as is
Draw the C4 bump circles
    Ask user for C4 bump circle diameter
    (Note: The die C4 bumps from the GDSII file are polygons within polygons and the package C4 bumps are circles)
        Convert polygons to circles
            Determine the center of polygon
            Draw the circle using the center of polygon
            Erase the old polygons
ID the C4 bump X,Y coordinates and C4 bump name
    Ask user for C4 pitch in X-axis
    Ask user for C4 pitch in Y-axis
    Ask user for C4 pitch offset in X-axis
        Offset # is needed because some C4 bumps are not on the exact grid/pitch, but are offset by some number. The offset # will be less than half the C4 pitch
    Ask user for C4 pitch offset in Y-axis
    Ask user for size of C4 bump
    Once the pitches, offsets and size of C4 bump are known, find A1 corner.
        A1 is assumed to be at the lower right hand corner of the die
    Label Y-axis with letters A,B,C, etc. (Note: Software will skip I, O and any alphabetic character that looks like a number. E.g., "I" can be mistaken for "1", "O" can be mistaken for a zero
    Label X-axis with numbers
    Using the pitch and offset numbers, label any multiple of the pitches and offsets
    Draw the actual alphanumeric label inside the bump for visual ID
    Create an Allegro/APD script file
        The script file contains
            C4 bump X,Y coordinate, i.e. 1704.94 4035.94
            C4 label, i.e. AT06
            Repeat for all C4 bumps The package design program 62 is run under control of the script files 64 to produce the output data file 49 including the data for the labeled bumps. The script files 64 control the program 62 to perform the following steps as generally indicated at 74 in FIG. 13.

Launch Allegro/APD
Run initialization script
    Setup the drawing units, accuracy, size of the drawing, width and height of the drawing
    Setup the drawing grid
    Setup the C4 label text size
    Run drawing script
        The script draws the circles
        Label the text
        Repeat for all the C4 bumps
        Save the file as *.dra file
        Save the file as *.psm file The comparator program 66 is used to identify differences (e.g. design changes) between two sets of script files 64. The program 66 examines each of the two bumps in corresponding positions in the two files. If the bumps are the same, the program 66 proceeds to examine the next pair of bumps in corresponding positions. If the bumps are not the same, the program prints out a message and/or stores an exception message in a log file.

In summary, the present invention greatly reduces the time required for creating data which is to be provided to an integrated circuit package supplier for designing or changing a package for a particular flip-chip integrated circuit die. The invention also eliminates human error from the process, thereby greatly improving the reliability of the design process. Various modifications will become possible for those skilled in the art after receiving the teachings of the present disclosure without departing from the scope thereof.

I claim:

1. A computer implemented method for converting an input representation of a pattern of integrated circuit interconnects in a format suitable for a circuit design program into an output representation in a format suitable for a package design program, comprising the steps of:

(a) controlling the computer to run a converter program which converts the input representation into an intermediate representation in a format suitable for a mechanical design program; and (b) controlling the computer to run a mechanical design program which is adapted to automatically input the intermediate representation, identify and label the interconnects, and create the output representation in which the interconnects are labeled.

2. A method as in claim 1, in which the interconnects comprise flip-chip die bumps.

3. A method as in claim 1, in which:

the output representation comprises data; and the method further comprises the step of:

(c) controlling the computer to run a package design program which draws the labeled interconnects in accordance with the data.

4. A method as in claim 1, in which:

the format of the input representation is GDSII; and the format of the intermediate representation is DXF.

5. A method as in claim 1, further comprising the step, performed before step (b), of:

(c) providing script which adapts the mechanical design program to automatically input the intermediate representation, identify and label the interconnects, and create the output representation in which the interconnects are labeled.

6. A method as in claim 1, in which:

the input representation includes a plurality of integrated circuit layers, only one of which includes the interconnects; and step (a) further includes extracting the layer which includes the interconnects.

7. A method as in claim 6, further comprising the steps, performed before. step (a), of:

(c) providing the converter program; and (d) providing script which adapts the converter program to extract the layer which includes the interconnects;

in which step (a) comprises running the converter program as adapted by the script.

8. A method as in claim 1, in which the mechanical design program in step (b) is further adapted to create the output representation such that the pattern is rotated by a predetermined angle relative to the input representation.

9. A method as in claim 1, in which the mechanical design program in step (b) is further adapted to create the output representation such that the pattern is mirrored relative to the input representation.

10. A method as in claim 1, in which the mechanical design program in step (b) is further adapted to create the output representation such that a size of the output representation is smaller than a size of the input representation.

11. A method as in claim 1, further comprising the step of:

(c) controlling the computer to compare the output representation with a previously created output representation and identify a difference therebetween.

12. A digital data storage medium for storing computer software for converting an input representation of a pattern of integrated circuit interconnects in a format suitable for a circuit design program into an output representation in a format suitable for a package design program, comprising:

a converter program for controlling a computer to convert the input representation into an intermediate representation in a format suitable for a mechanical design program; and a mechanical design program which is adapted to control the computer to automatically input the intermediate representation, identify and label the interconnects, and create the output representation in which the interconnects are labeled.

13. A medium as in claim 12, in which the interconnects comprise flip-chip die bumps.

14. A medium as in claim 12, in which:

the output representation comprises data for a package design program; and the system further comprises a package design program which draws the labeled interconnects in accordance with the data.

15. A medium as in claim 12, in which:

the format of the input representation is GDSII; and the format of the intermediate representation is DXF.

16. A medium as in claim 12, in which the software further comprises script which adapts the mechanical design program to automatically input the intermediate representation, identify and label the interconnects, and create the output representation in which the interconnects are labeled.

17. A medium as in claim 12, in which:

the input representation includes a plurality of integrated circuit layers, only one of which includes the interconnects; and the converter program is adapted to extract the layer which includes the interconnects.

18. A medium as in claim 17, in which the software further comprises script which adapts the converter program to extract the layer which includes the interconnects.

19. A medium as in claim 12, in which the mechanical design program is further adapted to create the output representation such that the pattern is rotated by a predetermined angle relative to the input-representation.

20. A medium as in claim 12, in which the mechanical design program is further adapted to create the output representation such that the pattern is mirrored relative to the input representation.

21. A medium as in claim 12, in which the mechanical design program is further adapted to create the output representation such that a size thereof is smaller that a size of the input representation.

22. A medium as in claim 12, in which the software further comprises a comparator program for comparing the output representation with a previously created output representation and identifying a difference therebetween.

23. A digital data storage medium for storing software script for a computer system which converts an input representation of a pattern of integrated circuit interconnects in a format suitable for a circuit design program into an output representation in a format suitable for a package design program, the system including a converter program for controlling a computer to convert the input representation into an intermediate representation in a format suitable for a mechanical design program, and a mechanical design program, the script adapting the mechanical design program to automatically perform the steps of:

(a) inputting the intermediate representation;

(b) identifying and labeling the interconnects; and (c) creating the output representation in which the interconnects are labeled.

24. A medium as in claim 23, in which the interconnects comprise flip-chip die bumps.

25. A medium as in claim 23, in which:

the output representation comprises data;

the system further comprises a package design program; and the package design program draws the labeled interconnects in accordance with the data.

26. A medium as in claim 23, in which:

the format of the input representation is GDSII; and the format of the intermediate representation is DXF.

27. A medium as in claim 23, in which:

the input representation includes a plurality of integrated circuit layers, only one of which includes the interconnects; and the script further adapts the converter program to extract the layer which includes the interconnects.

28. A medium as in claim 27, in which the script further adapts the converter program to extract the layer which includes the interconnects.

29. A medium as in claim 23, in which the script further adapts the mechanical design program to create the output representation such that the pattern is rotated by a predetermined angle relative to the input representation.

30. A medium as in claim 23, in which the script further adapts the mechanical design program to create the output representation such that the pattern is mirrored relative to the input representation.

31. A medium as in claim 23, in which the script further adapts the mechanical design program to create the output representation such that a size of the output representation is smaller that a size of the input representation.

* * * * *